US009786922B2

(12) United States Patent
Pratt (10) Patent No.: US 9,786,922 B2
(45) Date of Patent: Oct. 10, 2017

(54) VOLTAGE AND REDUCED POLARIZATION WITHIN MERCURY FREE ZINC AIR CELLS

(71) Applicant: Spectrum Brands, Inc., Madison, WI (US)

(72) Inventor: Paul Pratt, Lone Rock, WI (US)

(73) Assignee: SPECTRUM BRANDS, INC., Middleton, WI (US)

(*) Notice: Subject to any disclaimer, the term of this patent is extended or adjusted under 35 U.S.C. 154(b) by 504 days.

(21) Appl. No.: 13/945,383

(22) Filed: Jul. 18, 2013

(65) Prior Publication Data

US 2014/0057183 A1 Feb. 27, 2014

Related U.S. Application Data

(60) Provisional application No. 61/691,473, filed on Aug. 21, 2012.

(51) Int. Cl.
*H01M 4/86* (2006.01)
*H01M 4/12* (2006.01)
*H01M 4/62* (2006.01)
*H01M 12/06* (2006.01)
*H01M 6/04* (2006.01)

(52) U.S. Cl.
CPC .......... *H01M 4/8652* (2013.01); *H01M 4/12* (2013.01); *H01M 4/628* (2013.01); *H01M 12/06* (2013.01); *H01M 6/045* (2013.01); *H01M 2300/0002* (2013.01)

(58) Field of Classification Search
USPC .................................................. 429/405–406
See application file for complete search history.

(56) References Cited

U.S. PATENT DOCUMENTS

| | | | | |
|---|---|---|---|---|
| 5,840,214 A | * | 11/1998 | Kinlen | H01B 1/128 252/500 |
| 6,197,451 B1 | * | 3/2001 | Steinbrecher | H01M 10/08 29/623.1 |
| 2003/0138694 A1 | * | 7/2003 | Ndzebet | H01M 4/06 429/212 |
| 2004/0076878 A1 | * | 4/2004 | Ndzebet | H01M 4/244 429/212 |
| 2007/0122709 A1 | | 5/2007 | Pratt et al. | |
| 2007/0248880 A1 | | 10/2007 | Ndzebet et al. | |

OTHER PUBLICATIONS

Extended European Search Report issued for European Patent Application No. 13180958.4 (Nov. 4, 2013)(6 pages).
Communication pursuant to Article 94(3) EPC received in EP Appl. No. 13180958.4 dated Feb. 24, 2017 (7 pages).

* cited by examiner

*Primary Examiner* — Osei Amponsah
(74) *Attorney, Agent, or Firm* — Foley & Lardner LLP (57) ABSTRACT

The present disclosure is directed to a zinc air cell with improved voltage and reduced polarization. The combination of an anode corrosion inhibitor with a surfactant system yields enhanced cell voltage and capacity for the cell that are above the individual contributions of the corrosion inhibitor and the surfactant system.

6 Claims, 9 Drawing Sheets

VOLTAGE AND REDUCED POLARIZATION WITHIN MERCURY FREE ZINC AIR CELLS

CROSS-REFERENCE TO RELATED APPLICATION

This application claims priority from U.S. Provisional Patent Application Ser. No. 61/691,473, filed Aug. 21, 2012, the entire contents of which are incorporated herein by reference.

FIELD OF THE DISCLOSURE

The present disclosure is directed to a zinc air cell with improved voltage and reduced polarization. More particularly, the present disclosure is directed to a zinc air cell that utilizes a combination of an anode corrosion inhibitor with a surfactant system that yields enhanced cell voltage and capacity for the cell that are above the individual contributions of the corrosion inhibitor and the surfactant system.

BACKGROUND OF THE DISCLOSURE

In the field of zinc air cells, manufacturers continue to search for ways to create cells with higher voltage, more stable voltage through discharge, better capacity and more cell power to achieve better device functionality.

Anodes of electrochemical cells are prone to electrochemical corrosion, reactions when stored at or above room temperature. The electrolyte in the anode may corrode the anode upon contact, forming oxidized products that decrease the availability of active anode material while simultaneously generating hydrogen gas. The rate of corrosion tends to increase as the electrolyte is made more dilute and as the storage temperature rises, and can lead to a significant decrease in cell capacity. Cell discharge performance, on the other hand, can be improved by making the electrolyte increasingly diluted. It is thus desirable to suppress gas generation when using diluted electrolytes for increased performance.

To minimize undesirable corrosion and gassing during storage, it is typical to employ corrosion-resistant alloys and to reduce the extent of impurities in the anode. Additionally, organic surfactants and inorganic corrosion-inhibiting agents are commonly added to anodes. Surfactants act at the anode-electrolyte interface by forming a hydrophobic film that protects the anode surface during storage. The inhibitive efficiency of surfactants to increase the corrosion resistance of anode material depends on their chemical structure, concentration, and their stability in the electrolyte.

Despite their ability to control gel gassing and cell gassing, many corrosion-inhibiting materials used in the art also typically decrease high rate discharge performance in electrochemical cells and can adversely affect intermittent cell discharge performance. It is believed that discharge performance suffers as a result of anode failure caused by a combination of passivation, hydroxide ion depletion, and reduction in hydroxide ion diffusion. Therefore, new approaches are sought for inhibiting corrosion and preventing leakage, without simultaneously reducing high rate cell discharge performance. At the same time, it is also of interest to develop new classes of surfactants for use in anodes of electrochemical cells. Still further, extension of service life by chemical and physical modifications to the anode without sacrificing improvements in corrosion resistance and electrochemical behavior are also highly sought.

There remains a need, therefore, for a cell that reduces voltage suppression and inhibits corrosion while providing good cell capacity and a higher, stable voltage.

SUMMARY OF THE DISCLOSURE

Briefly, therefore, the present disclosure is directed to an electrochemical cell comprising a cathode; an anode comprising an anode mix, wherein the anode mix comprises a polyaniline corrosion inhibitor and an electrolyte comprising a surfactant system; wherein the surfactant system comprises a hexyl diphenyl oxide disulfonic acid surfactant and at least one amphoteric surfactant; and, a separator disposed between the anode and the cathode.

The present disclosure is also directed to an anode mix comprising a polyaniline corrosion inhibitor and an electrolyte comprising a surfactant system, wherein the surfactant system comprises a hexyl diphenyl oxide disulfonic acid surfactant and at least one amphoteric surfactant.

BRIEF DESCRIPTION OF THE DRAWINGS

It is to be noted that corresponding reference characters indicate corresponding parts throughout the several views of the drawings.

It is also to be noted that the design or configuration of the components presented in this figures is not to scale and/or is intended for purposes of illustration only. Accordingly, the design or configuration of the components may be other than herein described without departing from the intended scope of the present disclosure. This figure should therefore not be viewed in a limiting sense.

DETAILED DESCRIPTION OF THE DISCLOSURE

In accordance with the present disclosure, an improved electrochemical cell has been discovered for providing higher voltage, more stable voltage through discharge, better capacity and more cell power to achieve better device functionality. More specifically, it has been discovered that an anode mix comprising a polyaniline corrosion inhibitor and an electrolyte comprising a surfactant system can result in an improvement of higher voltage, better capacity and minimal polarization in the anode while reducing voltage suppression and maintaining gassing reliability. Both the corrosion inhibitor and the surfactant system separately lead to improvements in cell voltage and cell performance, however, the combination results in improved cell voltage and cell performance greater than their individual additive effects.

In particular, in accordance with the present disclosure, the surfactant system helps to reduce voltage suppression while maintaining gassing reliability, and the polyaniline can be used as a corrosion inhibitor to help maintain a clean zinc surface, which in turn increases cell voltage and efficiency.

It is to be noted that the electrochemical cell of the present disclosure may be configured in accordance or consistent with zinc air cell designs generally known in the art, such as zinc/silver oxide batteries, zinc/manganese dioxide batteries, etc., but for the design improvements provided in detail herein below. For example, in various embodiments the electrochemical cells of the present disclosure may be designed to specifications suitable for a button size battery. In particular, the electrochemical cell may be a zinc air cell, such as a zinc air button cell. In some embodiments, the shape of the cell is such that the anode is held in a somewhat flat or pan-shaped position. Accordingly, generally speaking, an exemplary embodiment of a cell of the present disclosure may be as illustrated in FIG. 1.

Figure 1:
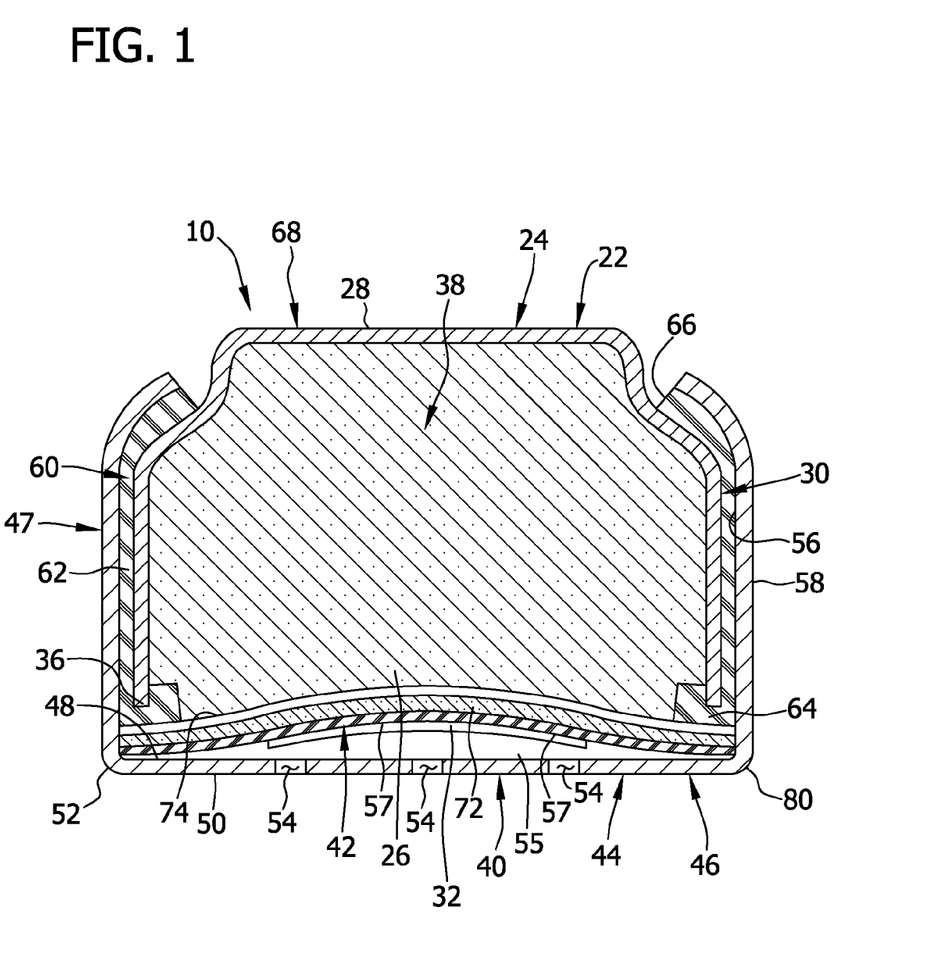
FIG. 1 is a cross-sectional, schematic view depicting an exemplary electrochemical cell of an embodiment of the present disclosure.

As illustrated in FIG. 1, referring specifically to the cell 10, the negative electrode contains the anode can assembly 22, with an anode can 24 including an electrochemically reactive anode 26 contained therein and an insulating gasket 60. The anode can 24 has a base wall 28, and circumferential downwardly-depending side wall 30. Side walls 30 terminate in a circumferential can foot 36. The base wall and side walls 30 generally define the anode cavity 38 within the anode can 24, which cavity contains the anode 26.

The positive electrode contains a cathode can assembly 40, which includes a cathode can 44 and the cathode 42. The cathode 42 comprises the area from below the separator 74 to the cathode can 44. This cathode 42 area includes the porous diffusion layer 57, the cellulose air diffusion layer and the cathode active layer 72. Cathode can 44 has a bottom 46, and a circumferential upstanding side wall 47. Bottom 46 has a generally flat inner surface 48, a generally flat outer surface 50, and an outer perimeter 52 defined on the flat outer surface 50. A plurality of air ports 54 extend through the bottom 46 of the cathode can 44, providing avenues for traverse of oxygen through the bottom 46 into the adjacent cathode can assembly 40. An air reservoir 55 spaces the cathode can assembly 40 from bottom 46 and the corresponding air ports 54. A porous diffusion layer 57 and a cellulose air diffusion layer 32 fill the air reservoir 55. Side wall 47 of the cathode can has an inner surface 56 and an outer surface 58.

The anode can assembly 22 is electrically insulated from the cathode can assembly 40 by an insulating gasket 60. Insulating gasket 60 includes a circumferential side wall 62 disposed between the upstanding side wall 47 of the cathode can and the downwardly-depending side wall 30 of the anode can. An insulating gasket foot 64 is disposed generally between the can foot 36 of the anode can and the cathode can assembly 40. An insulating gasket top 66 is positioned at the locus where the side wall 62 of insulating gasket 60 extends from between the side walls 30 and 47 adjacent the top of the cell.

The outer surface 68 of the cell 10 is thus defined by portions of the outer surface of the top of the anode can 24, outer surface 58 of the side wall 47 of the cathode can 44, outer surface 50 of the bottom of the cathode can 44, and the top 66 of the insulating gasket 60.

With the exceptions detailed in the present disclosure, the various components of the electrochemical cell may, in general, be prepared of materials, and using techniques, generally known in the art.

A. Negative Electrode

The negative electrode includes an anode, an anode active material and an anode can assembly that surrounds the active material. In a preferred embodiment, the anode active material is zinc. In this regard, it is to be noted that, as used herein, anode "active material" may refer to a single chemical compound that is part of the discharge reaction at the anode of a cell and contributes to the cell discharge capacity, including impurities and small amounts of other moieties that may be present therein. Thus, this phrase does not include current collectors, electrode leads, etc., that may contain or support the active material.

The function of the anode, in a preferred embodiment, is to react zinc metal with hydroxyl ions to thereby produce electrons according to the anode half reaction, the reaction correspondingly producing zinc oxide. The locus of such reaction is initially located adjacent the air cathode assembly in a fresh unused cell, and as the cell is used, the locus of reaction moves, generally as a reaction front, from the region of the separator upward toward the anode can.

The anode can may comprise an alloy of copper, which comprises copper and at least three metals selected from the group consisting of aluminum, silicon, cobalt, tin, chromium and zinc. In one suitable embodiment of the present disclosure, the entire anode can comprises the copper alloy.

B. Anode Mix

The electrochemical cell of the present disclosure further comprises an anode mix comprising an electrolyte and a corrosion inhibitor. The electrolyte comprises a surfactant system. Both the corrosion inhibitor and the surfactant system lead to improvements of cell voltage and cell performance within the cell; however, it has been surprisingly discovered that this combination results in enhanced cell voltage and cell performance greater than their individual additive effects.

1. Corrosion Inhibitor

The anode mix comprises a corrosion inhibitor, which affects cell capacity and voltage stability. The corrosion inhibitor helps to maintain a clean zinc surface, which in turn increases cell voltage and efficiency.

In a preferred embodiment of the present disclosure, the corrosion inhibitor is a polyaniline. Preferably, the polyaniline is a polyaniline emeraldine base. That is, preferably the polyaniline is a non-acid doped form of polyaniline and is not a conductive form of polyaniline. The emeraldine form of polyaniline is neutral and has a high stability at room temperature. It is noted, however, that though the polyaniline may act as a corrosion inhibitor, it may also provide other benefits that do not limit the polyaniline to acting just as a corrosion inhibitor. Thus, referring to the polyaniline as a "corrosion inhibitor" does not limit the polyaniline to only that particular function.

The polyaniline can be present in an amount of from about 100 ppm to about 500 ppm, and preferably about 250 ppm, by weight of the anode mix.

The anode mix may also include indium hydroxide in combination with the corrosion inhibitor. The indium hydroxide can be present in an amount of from about 2,000 ppm to about 4,000 ppm, preferably from about 2,500 ppm to about 3,500 ppm, and even more preferably about 3,000 ppm, by weight of the anode mix.

Additionally, the anode mix may further comprise a polyacrylate polymer in combination with the corrosion inhibitor. The polyacrylate polymer can be present in an amount of from about 1,000 ppm to about 3,000 ppm, preferably from about 1,500 ppm to about 2,500 ppm, and even more preferably about 2,000 ppm, by weight of the anode mix. A suitable polyacrylate polymer in the present disclosure is a cross-linked polyacrylate polymer, for example, Carbopol® 934, from The Lubrizol Corporation, 29400 Lakeland Boulevard, Wickliffe, Ohio, 44092-2298.

In an exemplary embodiment of the present disclosure, the anode mix will comprise from about 100 ppm to about 500 ppm of polyaniline, from about 2,000 ppm to about 4,000 ppm of indium hydroxide, and from about 1,000 ppm to about 3,000 ppm of a cross-linked polyacrylate polymer. In a preferred embodiment of the present disclosure, the anode mix comprises about 250 ppm of polyaniline, about 3,000 ppm of indium hydroxide and about 2,000 ppm of a cross-linked polyacrylate polymer.

When the polyaniline, indium hydroxide and cross-linked polyacrylate polymer are used in combination with a zinc anode, the anode produces improved results for cell capacity and voltage stability.

2. Electrolyte Surfactant System

The anode mix also comprises an electrolyte comprising a surfactant system. The surfactant system reduces voltage suppression in cells while maintaining gassing reliability.

The surfactant system of the present disclosure comprises a hexyl diphenyl oxide disulfonic acid surfactant and at least one amphoteric surfactant. The combination of the hexyl diphenyl oxide disulfonic acid surfactant and the at least one amphoteric surfactant results in improved voltage suppression and better overall cell performance.

The hexyl diphenyl oxide disulfonic acid surfactant reduces voltage suppression that occurs when other surfactants in the industry are used. In one embodiment, the hexyl diphenyl oxide disulfonic acid surfactant has a density of from about 9.0 to about 10.0, preferably about 9.8 lbs/gallon. This surfactant may also have a pH of less than about 2.0. Further, this surfactant can have a solubility of about 50% in water.

In one embodiment, the hexyl diphenyl oxide disulfonic acid surfactant comprises from about 70% to about 75%, by weight, of sulfonated benzene, 1,1'-oxybis-,sec-hexyl derivatives. This surfactant may also comprise from about 0% to about 5%, preferably from about 2% to about 4%, by weight, of sulfuric acid. Further, this surfactant may also comprise from about 20% to about 30%, preferably from about 22% to about 28%, by weight, of water. In an exemplary embodiment, the hexyl diphenyl oxide disulfonic acid surfactant is Calfax® 6LA-70, available from Pilot Chemical Company, 2744 East Kemper Road, Cincinnati, Ohio, 45241. Though in one particular embodiment the Calfax® 6LA-70 is a surfactant, it can also act as a coupling agent and/or an HLB modifier in other embodiments of the present disclosure. Thus, the term "surfactant" is not to be seen in a limiting sense for the Calfax® 6LA-70, but, rather, is a description of one of the functions that hexyl diphenyl oxide disulfonic acids may provide.

In one embodiment of the present disclosure, the hexyl diphenyl oxide disulfonic acid surfactant is present in an amount of from about 500 ppm to about 5,000 ppm, by weight of the electrolyte. In a preferred embodiment, the hexyl diphenyl oxide disulfonic acid surfactant is present in an amount of about 3,000 ppm, by weight of the electrolyte. In another preferred embodiment, the hexyl diphenyl oxide disulfonic acid surfactant is present in an amount of about 4,500 ppm, by weight of the electrolyte.

The electrolyte surfactant system also comprises at least one amphoteric surfactant. In one embodiment of the present disclosure, the at least one amphoteric surfactant has a formula of Compound (I):

wherein: $R_1$ is an alkyl group having between 8 and 30 unbranched carbon atoms; $R_2$ is an alkyl group having between 1 to about 6 unbranched carbon atoms, optionally substituted with 1 or more hydroxyl substituents; $R_3$ is selected from a polyethylene oxide group having between 3 and 40 ethylene oxide units and a polypropylene oxide group having between 1 to 10 propylene oxide units; and X is an anionic acid group, an anionic acid ester, or an alkali metal salt of an anionic acid or acid ester.

Preferred compounds having the general formula of Compound (I) include complex amine carboxylates, particularly sodium and potassium salts of polyethoxylated fatty amino carboxylates wherein $R_1$ contains between 18 to 22 carbon atoms. A preferred embodiment is a steryl amino polyethoxylated carboxylate commercially available from BASF Corporation in approximately 70 percent diluted form under the name MAFO® 13.

In another embodiment, the at least one amphoteric surfactant has a formula of Compound (II):

wherein $R_4$ is an unbranched alkyl group having between 8 and 30 unbranched carbon atoms that form an aliphatic fatty amine when bound to the nitrogen atom; $R_5$ is selected from a polyethylene oxide group having between 3 and 40 ethylene oxide units and a polypropylene oxide group having between 1 and 10 propylene oxide units; and, $R_6$ is selected from hydrogen, a polyethylene oxide group having between 3 and 40 ethylene oxide units and a polypropylene oxide group having between 1 and 10 polypropylene oxide units.

An additive having the structure of Compound II can be, for example, a tertiary polyethoxylated fatty amine having two polyethylene oxide groups attached to the amine nitrogen.

In a further embodiment of the present disclosure, the surfactant system comprises a mixture of amphoteric surfactants, wherein the first amphoteric surfactant has the formula of Compound (I), wherein: $R_1$ is an alkyl group having between 8 and 30 unbranched carbon atoms; $R_2$ is an alkyl group having between 1 to about 6 unbranched carbon atoms, optionally substituted with 1 or more hydroxyl substituents; $R_3$ is selected from a polyethylene oxide group having between 3 and 40 ethylene oxide units and a polypropylene oxide group having between 1 to 10 propylene oxide units; and X is an anionic acid group, an anionic acid ester, or an alkali metal salt of an anionic acid or acid ester; and the second amphoteric surfactant has the formula of Compound (II), wherein $R_4$ is an unbranched alkyl group having between 8 and 30 unbranched carbon atoms that form an aliphatic fatty amine when bound to the nitrogen atom; $R_5$ is selected from a polyethylene oxide group having between 3 and 40 ethylene oxide units and a polypropylene oxide group having between 1 and 10 propylene oxide units; and, $R_6$ is selected from hydrogen, a polyethylene oxide group having between 3 and 40 ethylene oxide units and a polypropylene oxide group having between 1 and 10 polypropylene oxide units.

In a preferred aspect of the present disclosure, the amphoteric surfactant mixture comprises a blend of one or more polyethoxylated fatty amino carboxylates and one or more polyethoxylated fatty amines. An amphoteric surfactant mixture that comprises compounds having the general formulas of Compounds (I) and (II) and which is suitable for use in an anode of the disclosure is commercially available under the trade name MAFO® 13 MOD1 from BASF Corporation in approximately 90 percent diluted form. This commercially available amphoteric surfactant mixture is preferred by the inventors for use in anodes of the present disclosure.

In one embodiment of the present disclosure, the at least one amphoteric surfactant is present in an amount of from about 500 ppm to about 5,000 ppm, by weight of the electrolyte. In a preferred embodiment, the at least one amphoteric surfactant is present in an amount of about 3,000 ppm, by weight of the electrolyte. In another preferred embodiment, the at least one amphoteric surfactant is present in an amount of about 2,500 ppm, by weight of the electrolyte.

Additionally, the amphoteric surfactant mixture may be present in an amount of from about 500 ppm to about 5,000 ppm, by weight of the electrolyte. In a preferred embodiment, the amphoteric surfactant mixture is present in an amount of about 3,000 ppm, by weight of the electrolyte. In another preferred embodiment, the amphoteric surfactant mix is present in an amount of about 2,500 ppm, by weight of the electrolyte.

Additionally, the electrolyte can further comprise potassium hydroxide. When present in the electrolyte, the potassium hydroxide is in present in an amount of from about 30% to about 35%, by weight of the electrolyte. In a preferred embodiment, the potassium hydroxide is present in an amount of about 33%, by weight of the electrolyte.

In yet another aspect of the present disclosure, the electrolyte may further comprise a gelling agent. Any suitable gelling agent in the art may be used so long as it does not depart from the scope of the present disclosure. When present in the electrolyte, the gelling agent may be present in an amount of from about 500 ppm to about 1,500 ppm, by weight of the electrolyte. In a preferred embodiment, the gelling agent is present in an amount of about 1,000 ppm, by weight of the electrolyte. A suitable gelling agent in the present disclosure is a polyacrylic acid polymer, in one embodiment a cross-linked polyacrylic acid polymer, for example, Carbopol® ETD 2050, from The Lubrizol Corporation, 29400 Lakeland Boulevard, Wickliffe, Ohio, 44092-2298.

In a further embodiment, the electrolyte may further comprise zinc oxide. When present in the electrolyte, the zinc oxide may be present in an amount of from about 1% to about 5%, by weight of the electrolyte. In a preferred embodiment, the zinc oxide is present in an amount of about 2%, by weight of the electrolyte.

In still another aspect of the present disclosure, it is here disclosed that physical modifications to the anode can also improve cell service life, either alone or in combination with chemical modifications noted above. For example, one can efficiently discharge cells having an advantageously lower concentration of hydroxide ions in the electrolyte than can be used in conventional cells by reducing diffusion resistance for the hydroxide ions. This can be accomplished, for example, by adjusting the zinc particle size distribution to provide in the anode a narrow distribution of similar zinc particle sizes, thereby enhancing porosity (diffusion paths) for the hydroxide ions. In addition to improving diffusion properties, the particle size distributions of this disclosure also provide the porosity sites for the precipitation of ZnO, thereby delaying anode passivation. This approach is effective for use in the anodes of both manganese dioxide and zinc air cells and can be used alone or in combination with other improvements disclosed herein.

In a related aspect, a suitable zinc particle size distribution is one in which at least 70% of the particles have a standard mesh-sieved particle size within a 100 micron size range and in which the mode of the distribution is between about 100 and about 300 microns. In particular, particle size distributions meeting the above-noted tests and having a mode at 100 microns or at 150 microns or at 200 microns, each plus or minus about 10%, are advantageously used in the disclosure. It is preferred that about 70% of the particles be distributed in a size distribution range even more narrow than about 100 microns, for example about 50 microns, or even about 40 microns, or less.

In one embodiment of the present disclosure, the electrochemical cell may be prepared by any means known in the art, so long as the resulting cell does not conflict with the disclosures presented herein. Thus, the present disclosure includes a method of preparing an electrochemical cell containing the components and their respective concentrations as discussed throughout the entirety of this disclosure.

3. Performance Improvements

Each of the surfactant system and the polyaniline separately lead to enhanced cell voltage and overall cell performance. The inventors have surprisingly found, however, that when combined, the surfactant system and the polyaniline produce enhanced improvements that are more than the additive contributions of each. Thus, in one embodiment of the present disclosure, a composition is provided for improving cell voltage, the composition comprising a surfactant system and polyaniline, wherein the surfactant system comprises a hexyl diphenyl oxide disulfonic acid surfactant and at least one amphoteric surfactant.

In one embodiment of the present disclosure, the anode composition comprises hexyl diphenyl oxide disulfonic acid surfactant in an amount of from about 500 ppm to about 5,000 ppm, by weight of the electrolyte; the at least one amphoteric surfactant in an amount of from about 500 ppm to about 5,000 ppm, by weight of the electrolyte; and, the polyaniline in an amount of from about 100 ppm to about 500 ppm, by weight of the anode mix.

The at least one amphoteric surfactant in the composition can have the structure of Compound (I), Compound (II) or a mixture of Compound (I) and Compound (II) as described elsewhere throughout this disclosure. For example, in one preferred embodiment of the present disclosure, the composition comprises a surfactant system comprising a mixture of amphoteric surfactants, wherein the mixture comprises one or more polyethoxylated fatty amino carboxylates and one or more polyethoxylated fatty amines.

The anode composition may comprise the polyaniline and the components of the surfactant system in concentration amounts as described elsewhere throughout this disclosure. In a preferred embodiment, however, the composition comprises about 250 ppm of polyaniline, by weight of the anode mix; about 3,000 ppm of the hexyl diphenyl oxide disulfonic acid surfactant, by weight of the electrolyte; and, about 3,000 ppm of the at least one amphoteric surfactant, by weight of the electrolyte.

In another preferred embodiment, the anode composition comprises about 250 ppm of polyaniline, by weight of the anode mix; about 4,500 ppm of the hexyl diphenyl oxide disulfonic acid surfactant, by weight of the electrolyte; and, about 2,500 ppm of the at least one amphoteric surfactant, by weight of the electrolyte.

In an even more preferred embodiment, the composition comprises polyaniline and a surfactant system comprising a hexyl diphenyl oxide disulfonic acid surfactant (e.g., Calfax® 6LA-70) and a mixture of one or more polyethoxylated fatty amino carboxylates and one or more polyethoxylated fatty amines (e.g., MAFO® 13 MOD1).

In a particular embodiment of the present disclosure, an anode is provided that includes a combination of several of the components discussed elsewhere throughout this disclosure.

More specifically, the anode comprises polyaniline, indium hydroxide, a cross-linked polyacrylate polymer and an electrolyte comprising potassium hydroxide, zinc oxide, a cross-linked polyacrylic acid polymer, a hexyl diphenyl oxide disulfonic acid surfactant and at least one amphoteric surfactant. In a preferred embodiment, the at least one amphoteric surfactant is a mixture of one or more polyethoxylated fatty amino carboxylates and one or more polyethoxylated fatty amines.

The combination of the components in the anode provides for an enhanced improvement in cell voltage and cell performance.

C. Cathode

1. Cathode Assembly

The cathode of the present disclosure comprises a cathode can assembly 40, which includes a cathode can 44 and the cathode 42. An exemplary embodiment of the cathode 42 is best seen in FIG. 1. An active layer 72 of the cathode 42 is interposed between the separator 74 and the porous diffusion layer 57. Active layer 72 ranges preferably between about 50 microns and about 1,250 microns thick, and facilitates the reaction between the hydroxyl ions in the electrolyte and the cathodic oxygen of the air. Separator 74 is a micro-porous plastic membrane about 25 microns thick, typically polypropylene, having the primary function of preventing anodic zinc particles from coming into physical contact with the remaining elements of the cathode 42. Separator 74 however, does permit passage of hydroxyl ions and water therethrough to the cathode assembly.

Porous diffusion layer 57 is preferably a micro-porous hydrophobic polymeric material such as a polytetrafluoroethylene (PTFE) membrane about 25 to about 100 microns thick, which permits passage of air therethrough and which is generally impervious to battery electrolyte. In one embodiment, the porous diffusion layer 57 is Teflon®. The porous diffusion layer 57, in combination with the air ports 54, is used to efficiently transport oxygen to the active reaction surface area of the cathode assembly.

The cellulose air diffusion layer 32 is located underneath the porous diffusion layer 57 and acts as a protective lateral air diffusion layer. Specifically, when the cell is activated, the anode can assembly 22 presses down on the separator 74 and the cellulose air diffusion layer 32 helps to protect the air ports 54 from being completely covered.

Active layer 72 is further comprised of connecting substratum, namely a conductive woven nickel wire layer (not shown), capable of interfacing, as a current collector, with the cathode can. Carbon preferably forms a matrix surrounding the conductive layer of nickel wire. Nickel is preferred for the conductive layer because nickel exhibits little or no corrosion in the environment of the zinc air cell, and also because nickel is an excellent electrical conductor. The thickness of the cathode assembly between the separator 74 and the porous diffusion layer 57 should desirably be as small as possible.

2. Positive Electrode

The positive electrode is generally comprised of the cathode can assembly 40, which includes a cathode 42 and the cathode can 44. Referring to FIG. 1, the side wall 47 of the cathode can 44 is joined to the bottom 46 of the can by intermediate element 80. The outer surface of intermediate element 80 extends, from its lower end at outer perimeter 52 of outer surface 50 of bottom 46, to its upper end which joins the outer surface 58 of the side wall 47 in a generally vertical orientation. The inner surface, if any, of the intermediate element 80 is represented at the joinder of the inner surface 48 of the bottom 46 and the inner surface 56 of the side wall 47. In preferred embodiments of the disclosure, the inner surfaces 48 and 56 come together at a sharp corner, such that the inner surface of the intermediate element is of nominal dimension. To the extent the corner material is worked in forming the corner, the corner is work hardened, whereby the corner structure is strengthened with respect to bottom 46 and side wall 47 as the corner structure is formed at intermediate element 80.

The cathode can may be formed entirely of a metal or alloy having a hydrogen overvoltage similar to that of the cathode (as opposed to plating or cladding the can) so long as sufficient strength and ductility are available from the material selected. Materials in addition to nickel, having such hydrogen overvoltage properties, include, for example and without limitation, cobalt and gold. Such materials can be coated as one or more coating layers onto the core layer by, for example, plating, cladding, or other application processes. The ones of such materials providing sufficient strength and ductility can also be used as single layer materials in place of the composite structure which comprehends CRS or other suitable material as a core layer.

Steel strip plated with nickel and nickel alloy is generally used because of cost considerations, and because pre-plated steel strip, which generally requires no post-plating processes, is commercially available. The metal in the can must be both ductile enough to withstand the drawing process, and strong and rigid enough, to tolerate and otherwise withstand the cell crimping and closure process as well as to provide primary overall structural strength to the cell.

Cathode cans, for example, can be made of nickel-plated stainless steel. Other examples of materials for cathode cans include nickel-clad stainless steel; cold-rolled steel plated with nickel; INCONEL (a non-magnetic alloy of nickel); pure nickel with minor alloying elements (e.g. NICKEL 200 and related family of NICKEL 200 alloys such as NICKEL 201, etc.), all available from Huntington Alloys, a division of INCO, Huntington, West Va. Some noble metals may also find use as plating, cladding, or other coating for can metals, including covering steel strip plated with nickel, and mild steel strip subsequently plated with nickel after fabricating the can.

Where multiple layers are used (e.g., CRS) coated on opposing sides with nickel, the present disclosure contemplates additional (e.g. fourth, fifth, etc.) layers, either between the nickel and CRS, or with a nickel layer between the CRS and the additional layer(s). For example, gold, cobalt, or other excellent electrical conductor can be deposited on some or all of the outer surface of the cathode can (outside the nickel layer) after the can is drawn, or drawn and ironed. As an alternative, such fourth etc. layer can be, for example, a bond-enhancing layer between the CRS and the nickel.

Where the can is fabricated using a typical raw material structure of nickel/stainless steel (SST)/nickel

/NI/SST/NI/ as the sheet structure, such sheet structure is preferably about 0.005 inch thick, with a thickness range of about 0.003 inch to about 0.012 inch, and a preferred range of about 0.004 inch to about 0.006 inch. In such embodiments, each of the nickel layers represents about 1% to about 10%, preferably about 2% to about 4%, most preferably about 2%, of the overall thickness of the metal sheet in such 3-layer structure.

D. Insulating Gasket

The electrochemical cell of the present disclosure further comprises an insulating gasket. The insulating gasket is positioned generally between the cathode can and the anode can. The insulating gasket 60 can perform at least two primary functions. First, the insulating gasket serves as a closure for the cell, to prevent anode material and/or electrolyte from leaking from the cell between the outer surface of the side wall 30 of the anode can and the inner surface 56 of the side wall 47 of the cathode can. Thus, the insulating gasket must possess adequate liquid sealing properties to prevent such leakage. Generally, such properties are available in a variety of resiliently deformable thermoplastic polymeric materials.

Second, the insulating gasket provides electrical insulation, preventing all effective direct electrical contact between the anode can 24 and the cathode can 44. Accordingly, the side wall 62 of the insulating gasket must circumscribe, and provide electrical insulation properties about, the entirety of the circumference of the cell between outer surface and inner surface 56, generally from the top of side wall 47 to the bottom of side wall 30. Similarly, the foot 64 of the insulating gasket must circumscribe, and provide electrical insulation properties about, the entirety of the circumference of the cell between foot 36 of side wall 30, the lower portion of side wall 47, and the outer perimeter portion of the cathode can assembly 40. The combination of good liquid sealing properties and good electrical insulation properties is typically achieved by molding known battery-grade nylon polymeric material in the desired configuration.

In one exemplary embodiment of the present disclosure, in order to meet the electrical insulation requirements, the insulating gasket must have good dielectric insulation properties, must have a minimum thickness about side wall 62, and must be free of any pinholes or other imperfections that might permit transmission of electric current between side walls 30 and 47. Thickness for the insulating gasket side wall 62 of about 200 to about 250 microns is common in conventional electrochemical cells. Thickness as thin as 100 microns is acceptable for cells of the disclosure, using the same resiliently deformable thermoplastic nylon material as the thicker insulating gaskets of the conventional art.

Depending on the structure of the cell to which the insulating gasket is to be applied, intermediate thicknesses such as, e.g., 150 microns, 140 microns, 127 microns, or the like, may be selected for some cells. However, where cell volume efficiency is a driving consideration, preferred thicknesses are less, for example 120 microns or 110 microns to as thin as 100 microns. Thus, the range of thicknesses for insulating gaskets 60 preferred for use in cells 10 of the disclosure has a lower end of about 100 microns.

The following Examples describe various embodiments of the present disclosure. Other embodiments within the scope of the appended claims will be apparent to a skilled artisan considering the specification or practice of the disclosure provided herein. It is therefore intended that the specification, together with the Examples, be considered exemplary only, with the scope and spirit of the disclosure being indicated by the claims, which follow the Examples.

EXAMPLES

In the following examples, cells were tested using a control anode and a surge anode in accordance with the improvements of the present disclosure. The control anode included a control anode mix and a control electrolyte using components and combinations known in the art. The surge anode included a surge anode mix and a surge electrolyte using components and combinations disclosed in the present disclosure. Various combinations of the control/surge anode mixes and the control/surge anode electrolytes were also tested.

The control anode mix included zinc with the following coatings (by weight percentage of zinc): 0.3% Carbopol® 934; 0.3% Laponite RDS; and 0.3% indium hydroxide. The control electrolyte included 33% KOH, 2% zinc oxide, 1,000 ppm Carbopol® ETD 2050, and 7,500 ppm MAFO® 13 MOD1.

The surge anode mix in accordance with the present disclosure included zinc with the following coatings (by weight percentage of zinc): 250 ppm polyaniline emeraldine base; 3,000 µm indium hydroxide; and 2,000 ppm Carbopol® 934. The surge electrolyte in accordance with the present disclosure included 33% KOH, 2% zinc oxide, 1,000 ppm Carbopol® ETD 2050, 2,500 ppm MAFO® 13 MOD1, and 4,500 ppm Calfax® GLA-70.

Example 1—Surge Anode Mix Effect on Polarization

Two sets of 5 cells were tested for anode polarization. The first set of 5 cells included the control anode mix and the control electrolyte. The second set of 5 cells included the surge anode mix and the control electrolyte.

The cells were discharged at 2 mA constant current for 45 minutes, then discharged for 15 minutes at 5 mA constant current. This cycle was repeated for 12 hours. The cells were then given a 12-hour rest period before the cycles began again. The testing ended when the running voltage of the cells dropped below 0.9 V.

Figure 2:
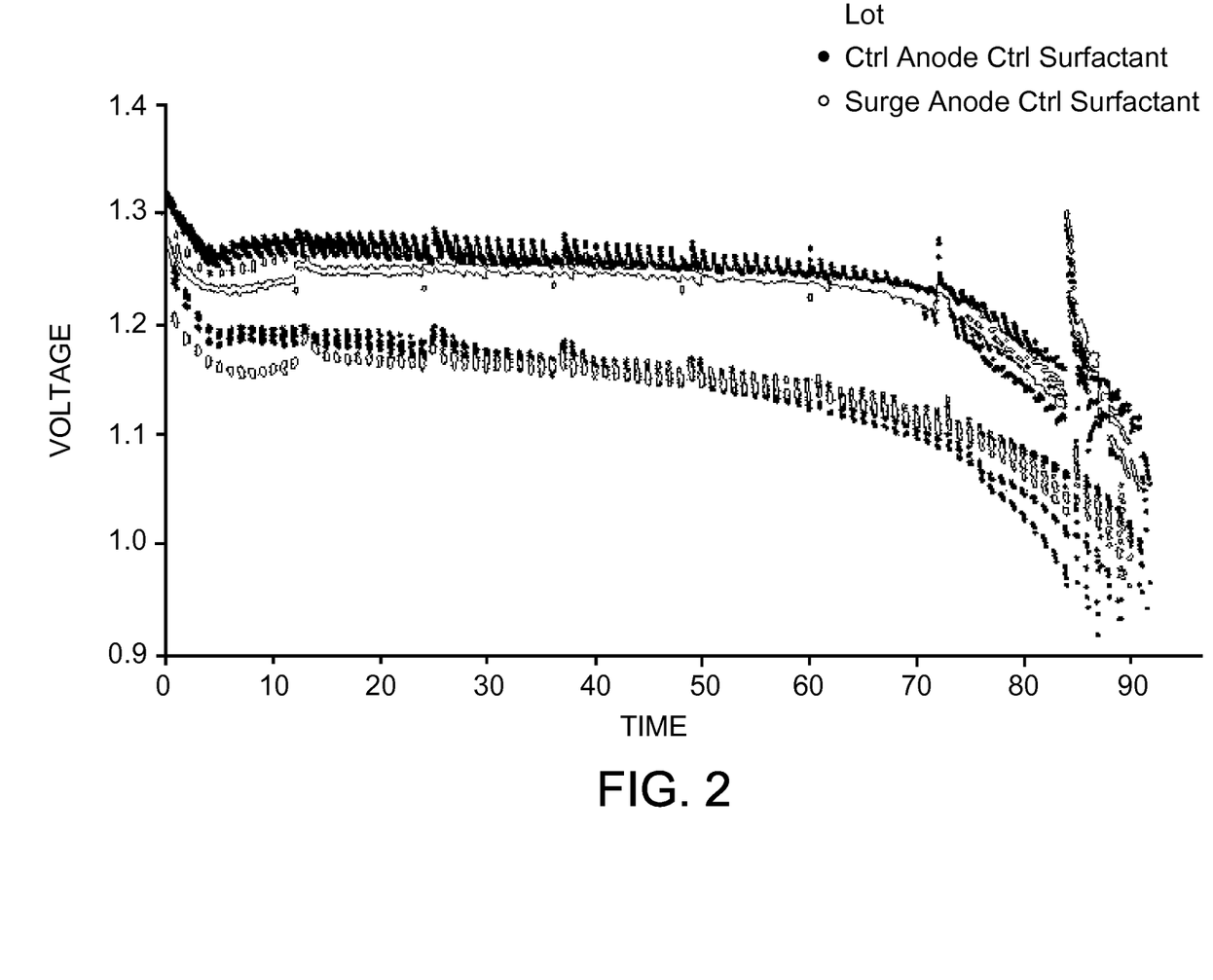
FIG. 2 is a graph of voltage vs. time for cells comprising a control anode mix and a control electrolyte and cells comprising a surge anode mix in accordance with the present disclosure and a control electrolyte.

The results of the testing are shown in FIG. 2, which is a scatterplot of Voltage vs. Time for the average of the first set of 5 cells (control anode/control electrolyte) and the average of the second set of 5 cells (surge anode/control electrolyte). As is shown in FIG. 2 and Table 1, the surge anode mix reduced the polarization of the anode.

TABLE 1

| Anode Mix | Electrolyte | Capacity (mAh) | Power (mWh) | Midpoint Voltage | Voltage Gain (mV) |
| --- | --- | --- | --- | --- | --- |
| Control | Control | 246.6 | 295.3 | 1.197 | 0 |
| Surge | Control | 246.8 | 293.5 | 1.189 | −8 |

Further testing was then done for each of these cells. The cells were discharged at 3 mA constant current for 2 hours followed by a 100 ms spike to 12 mA current. This cycle was repeated for 12 hours and was then followed by a 12-hour rest period for the cells before testing resumed. After resuming testing, the testing was stopped when the running voltage of the cells dropped below 0.9 V.

Figure 3:
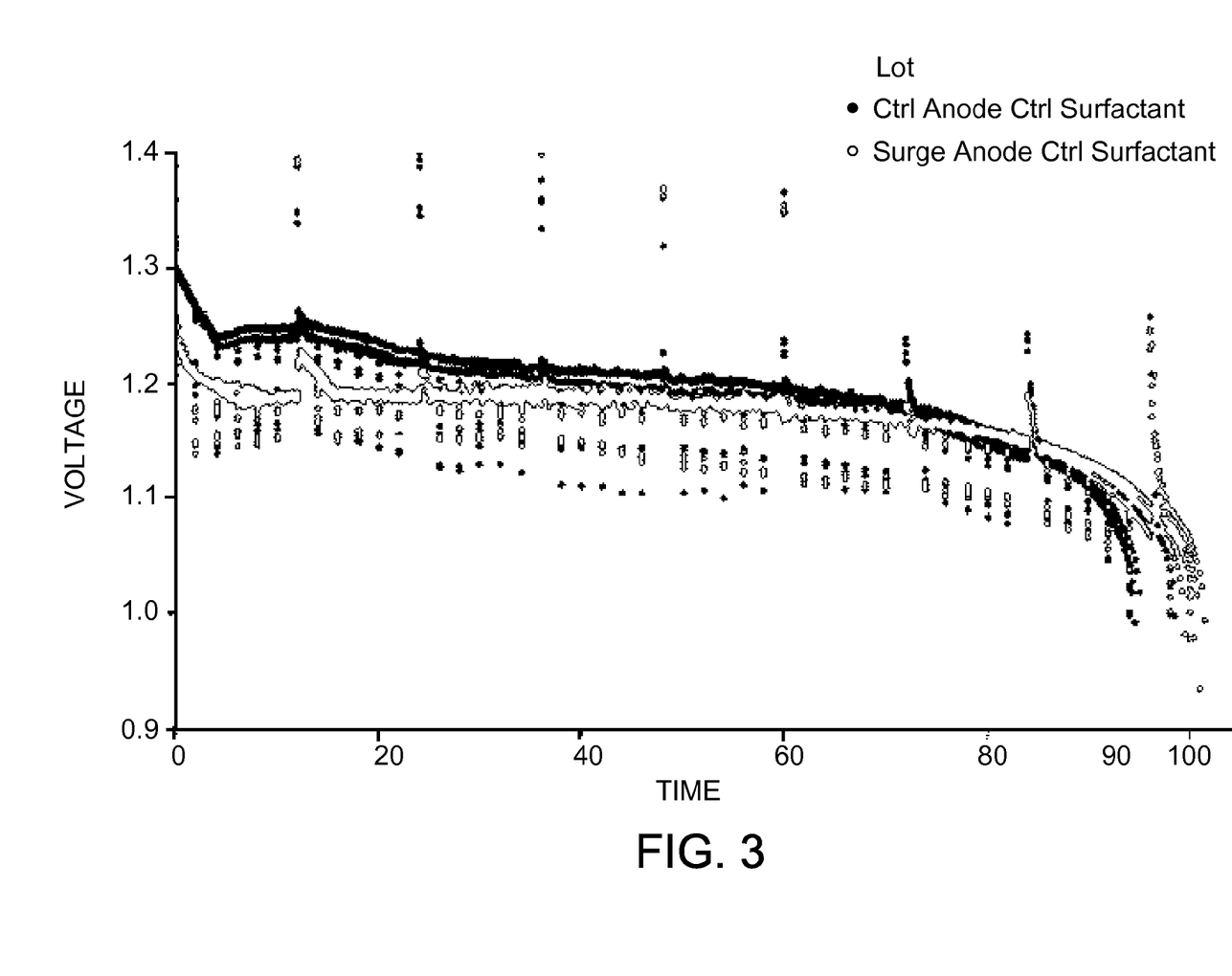
FIG. 3 is a graph of voltage vs. time for cells comprising a control anode mix and a control electrolyte and cells comprising a surge anode mix in accordance with the present disclosure and a control electrolyte.

The results of the testing are shown in FIG. 3, which is a scatterplot of Voltage vs. Time for the average of the first set of 5 cells (control anode/control electrolyte) and the average of the second set of 5 cells (surge anode/control electrolyte). As is shown in FIG. 3 and Table 2, the surge anode mix reduced the polarization of the anode.

TABLE 2

| Anode Mix | Electrolyte | Capacity (mAh) | Power (mWh) | Midpoint Voltage | Voltage Gain (mV) |
| --- | --- | --- | --- | --- | --- |
| Control | Control | 287.0 | 343.5 | 1.197 | 0 |
| Surge | Control | 302.0 | 354.3 | 1.173 | −24 |

Example 2—Surge Electrolyte Effect on Voltage

Two sets of 5 cells were tested for voltage output. The first set of 5 cells included the control anode mix and the control electrolyte. The second set of 5 cells included the control anode mix and the surge electrolyte.

The cells were discharged at 2 mA constant current for 45 minutes, then discharged for 15 minutes at 5 mA constant current. This cycle was repeated for 12 hours. The cells were then given a 12-hour rest period before the cycles began again. The testing ended when the running voltage of the cells dropped below 0.9 V.

Figure 4:
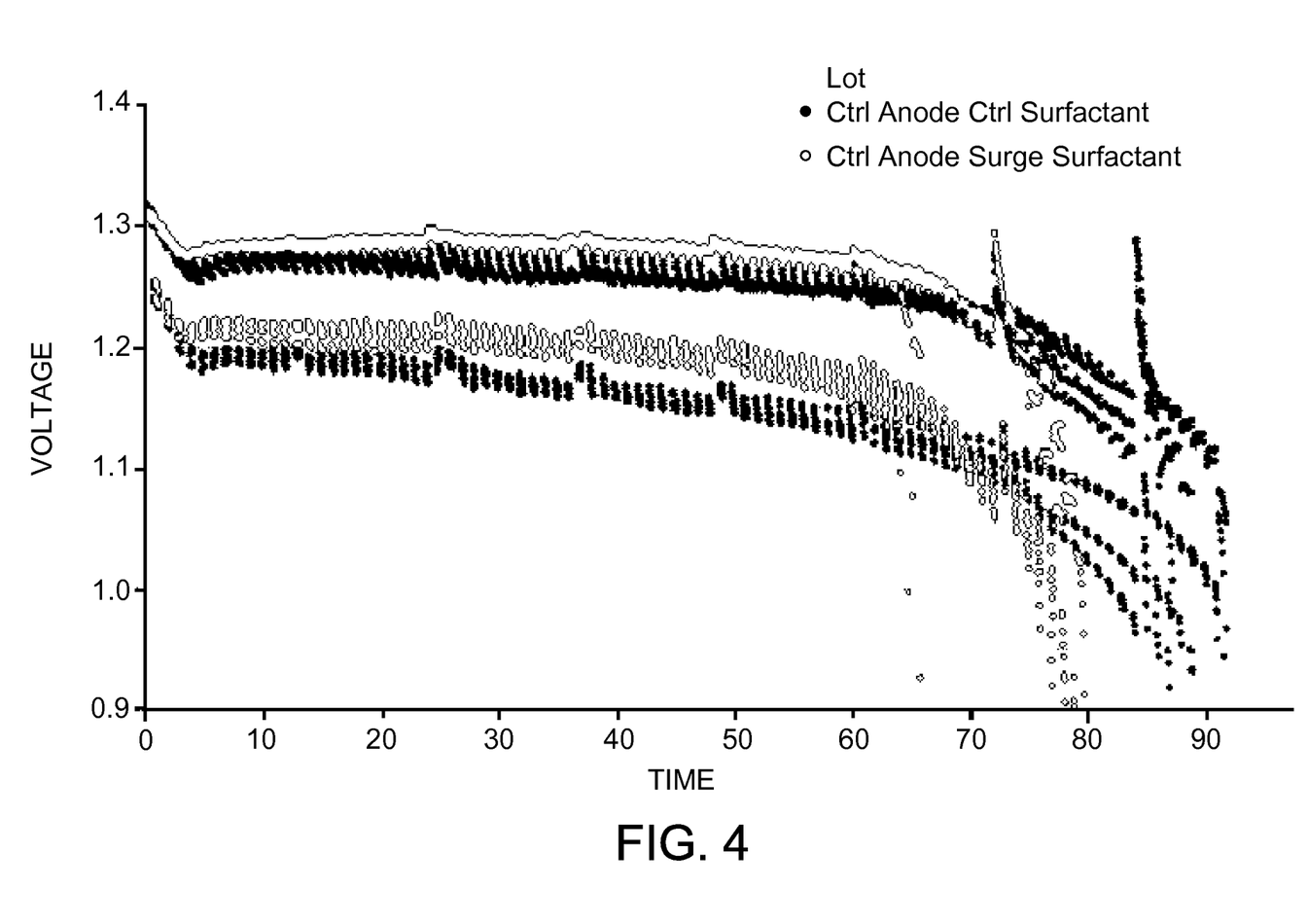
FIG. 4 is a graph of voltage vs. time for cells comprising a control anode mix and a control electrolyte and cells comprising a control anode mix and a surge electrolyte in accordance with the present disclosure.

The results of the testing are shown in FIG. 4, which is a scatterplot of Voltage vs. Time for the average of the first set of 5 cells (control anode/control electrolyte) and the average of the second set of 5 cells (control anode/surge electrolyte). As is shown in FIG. 4 and Table 3, the surge electrolyte increased the voltage of the cell.

TABLE 3

| Anode Mix | Electrolyte | Capacity (mAh) | Power (mWh) | Midpoint Voltage | Voltage Gain (mV) |
| --- | --- | --- | --- | --- | --- |
| Control | Control | 246.6 | 295.3 | 1.197 | 0 |
| Control | Surge | 214.8 | 264.4 | 1.231 | 34 |

Further testing was then done for each of these cells. The cells were discharged at 3 mA constant current for 2 hours followed by a 100 ms spike to 12 mA current. This cycle was repeated for 12 hours and was then followed by a 12-hour rest period for the cells before testing resumed. After resuming testing, the testing was stopped when the running voltage of the cells dropped below 0.9 V.

Figure 5:
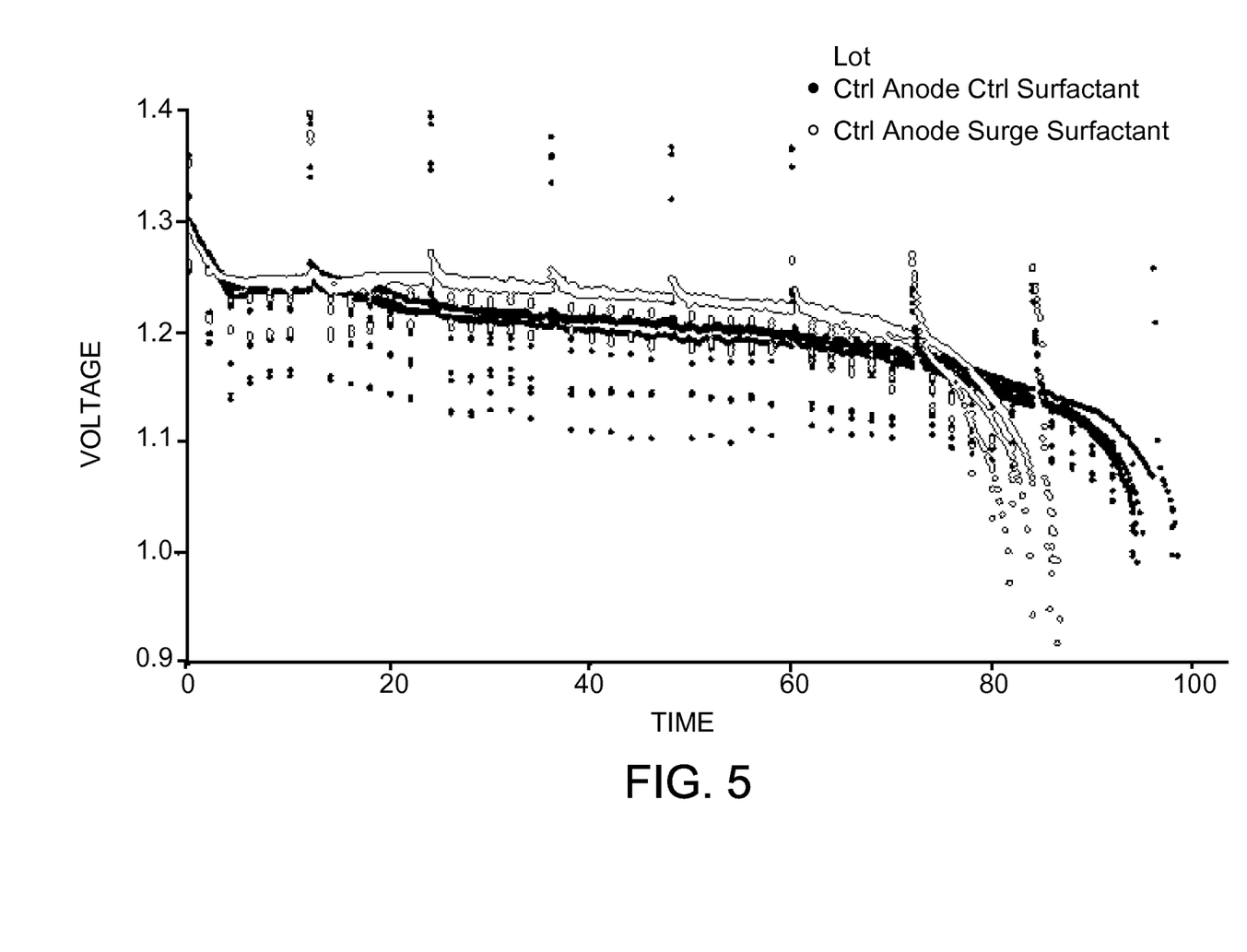
FIG. 5 is a graph of voltage vs. time for cells comprising a control anode mix and a control electrolyte and cells comprising a control anode mix and a surge electrolyte in accordance with the present disclosure.

The results of the testing are shown in FIG. 5, which is a scatterplot of Voltage vs. Time for the average of the first set of 5 cells (control anode/control electrolyte) and the average of the second set of 5 cells (control anode/surge electrolyte). As is shown in FIG. 5 and Table 4, the surge electrolyte increased voltage of the cell.

TABLE 4

| Anode Mix | Electrolyte | Capacity (mAh) | Power (mWh) | Midpoint Voltage | Voltage Gain (mV) |
| --- | --- | --- | --- | --- | --- |
| Control | Control | 287.0 | 343.5 | 1.197 | 0 |
| Control | Surge | 255.8 | 312.5 | 1.221 | 25 |

Example 3—Surge Anode Mix and Surge Electrolyte Effect on Polarization and Voltage Two sets of 5 cells were tested for voltage output and anode polarization. The first set of 5 cells included the control anode mix and the control electrolyte. The second set of 5 cells included the surge anode mix and the surge electrolyte.

The cells were discharged at 2 mA constant current for 45 minutes, then discharged for 15 minutes at 5 mA constant current. This cycle was repeated for 12 hours. The cells were then given a 12-hour rest period before the cycles began again. The testing ended when the running voltage of the cells dropped below 0.9 V.

Figure 6:
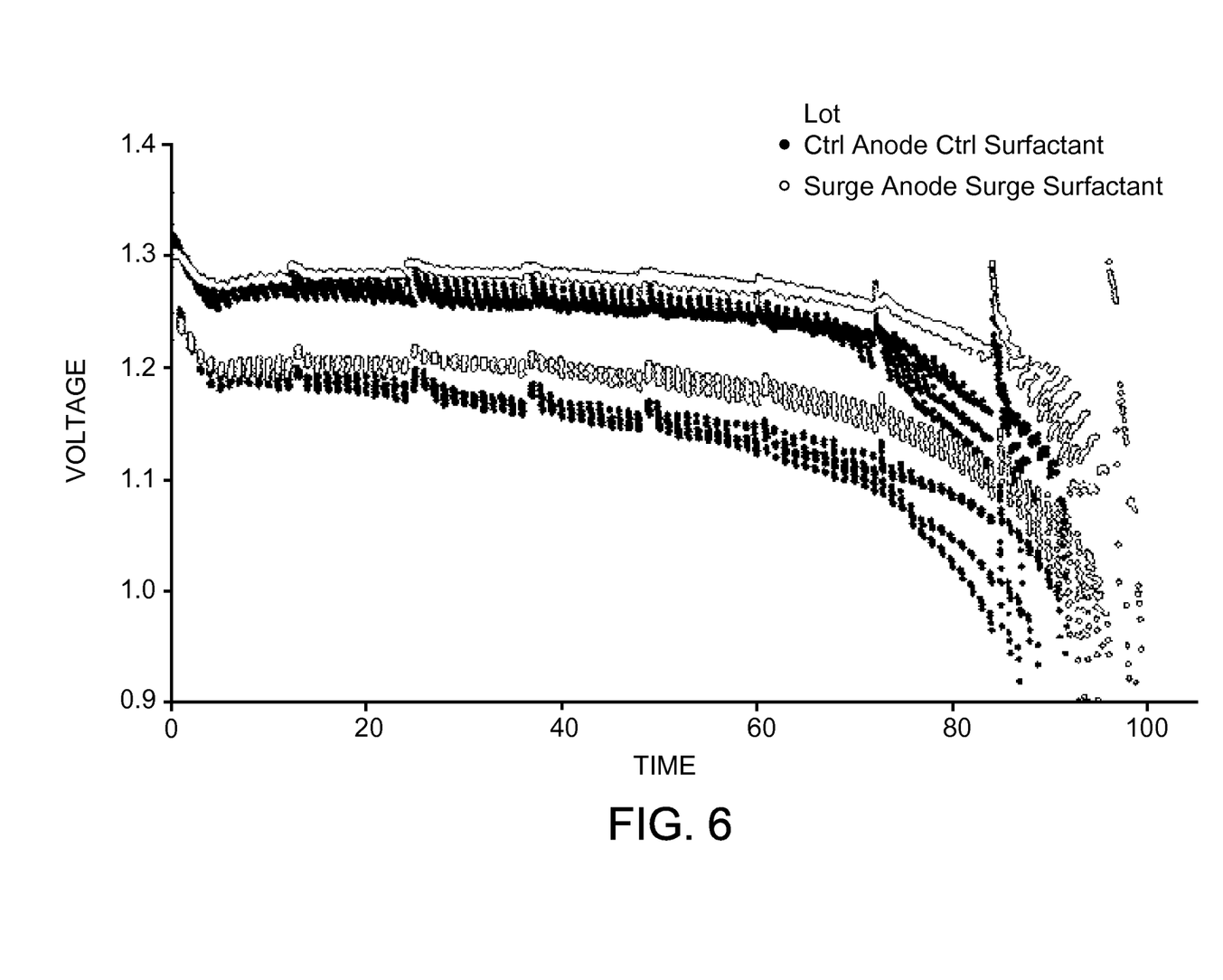
FIG. 6 is a graph of voltage vs. time for cells comprising a control anode mix and a control electrolyte and cells comprising a surge anode mix in accordance with the present disclosure and a surge electrolyte in accordance with the present disclosure.

The results of the testing are shown in FIG. 6, which is a scatterplot of Voltage vs. Time for the average of the first set of 5 cells (control anode/control electrolyte) and the average of the second set of 5 cells (surge anode/surge electrolyte). As is shown in FIG. 6 and Table 5, the surge anode mix reduced the anode polarization and the surge electrolyte increased the voltage of the cell. Furthermore, there is a greater than additive effect when the surge anode mix and the surge electrolyte are combined.

TABLE 5

| Anode Mix | Electrolyte | Capacity (mAh) | Power (mWh) | Midpoint Voltage | Voltage Gain (mV) |
| --- | --- | --- | --- | --- | --- |
| Control | Control | 246.6 | 295.3 | 1.197 | 0 |
| Surge | Surge | 261.4 | 319.5 | 1.222 | 25 |

Further testing was then done for each of these cells. The cells were discharged at 3 mA constant current for 2 hours followed by a 100 ms spike to 12 mA current. This cycle was repeated for 12 hours and was then followed by a 12-hour rest period for the cells before testing resumed. After resuming testing, the testing was stopped when the running voltage of the cells dropped below 0.9 V.

Figure 7:
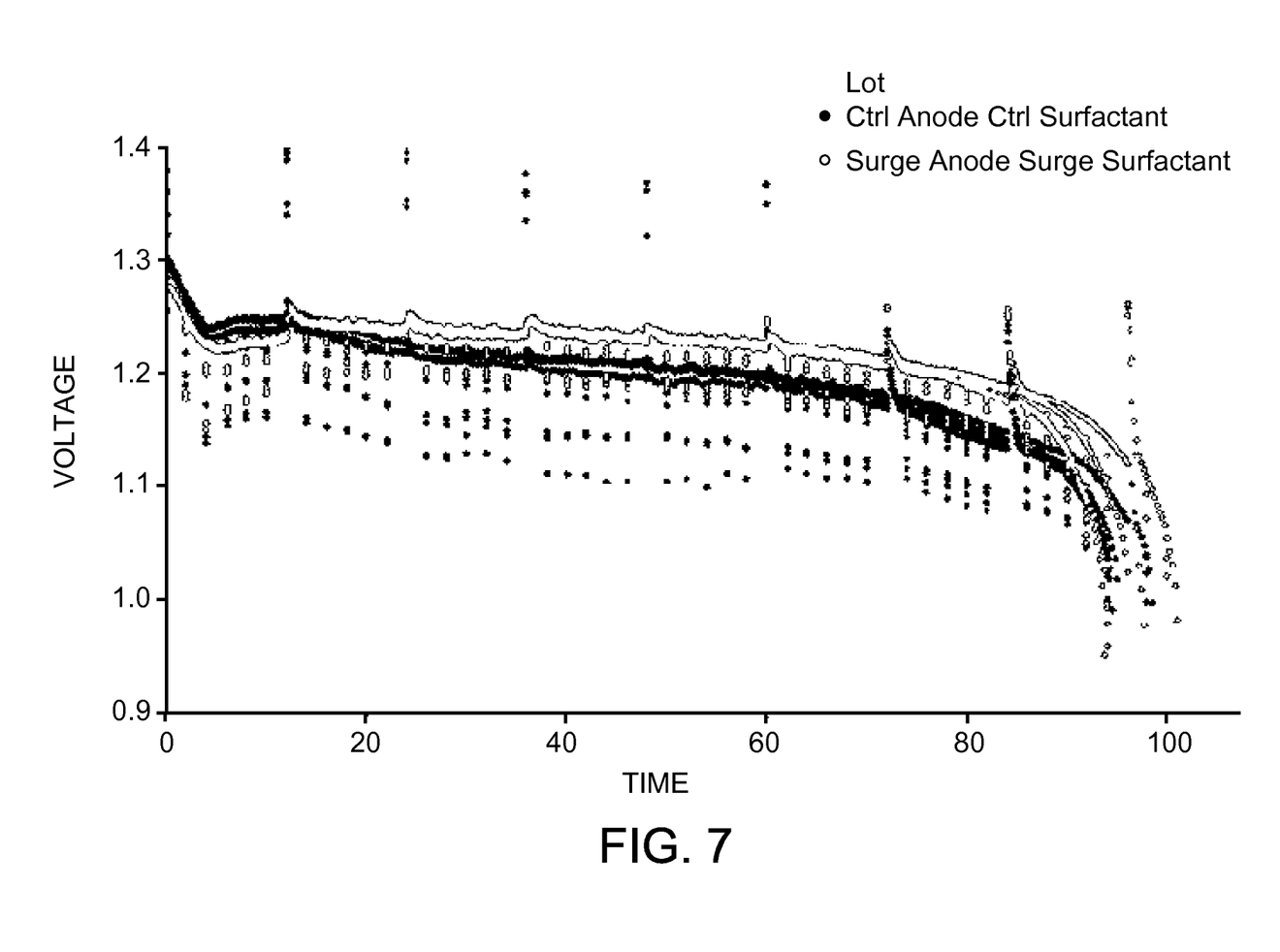
FIG. 7 is a graph of voltage vs. time for cells comprising a control anode mix and a control electrolyte and cells comprising a surge anode mix in accordance with the present disclosure and a surge electrolyte in accordance with the present disclosure.

The results of the testing are shown in FIG. 7, which is a scatterplot of Voltage vs. Time for the average of the first set of 5 cells (control anode/control electrolyte) and the average of the second set of 5 cells (surge anode/surge electrolyte). As is shown in FIG. 7 and Table 6, the surge electrolyte increased voltage of the cell and the surge anode mix reduced the polarization of the anode. Furthermore, there is a greater than additive effect when the surge anode mix and the surge electrolyte are combined.

TABLE 6

| Anode Mix | Electrolyte | Capacity (mAh) | Power (mWh) | Midpoint Voltage | Voltage Gain (mV) |
|---|---|---|---|---|---|
| Control | Control | 287.0 | 343.5 | 1.197 | 0 |
| Surge | Surge | 290.3 | 353.2 | 1.217 | 20 |

Example 4—Surge Anode Mix and Surge Electrolyte Effect On Polarization and Voltage Four sets of 5 cells were tested for voltage output and anode polarization. The first set of 5 cells included the control anode mix and the control electrolyte. The second set of 5 cells included the surge anode mix and the control electrolyte. The third set of 5 cells included the control anode mix and the surge electrolyte. The fourth set of 5 cells included the surge anode mix and the surge electrolyte.

The cells were discharged at 2 mA constant current for 45 minutes, then discharged for 15 minutes at 5 mA constant current. This cycle was repeated for 12 hours. The cells were then given a 12-hour rest period before the cycles began again. The testing ended when the running voltage of the cells dropped below 0.9 V.

Figure 8:
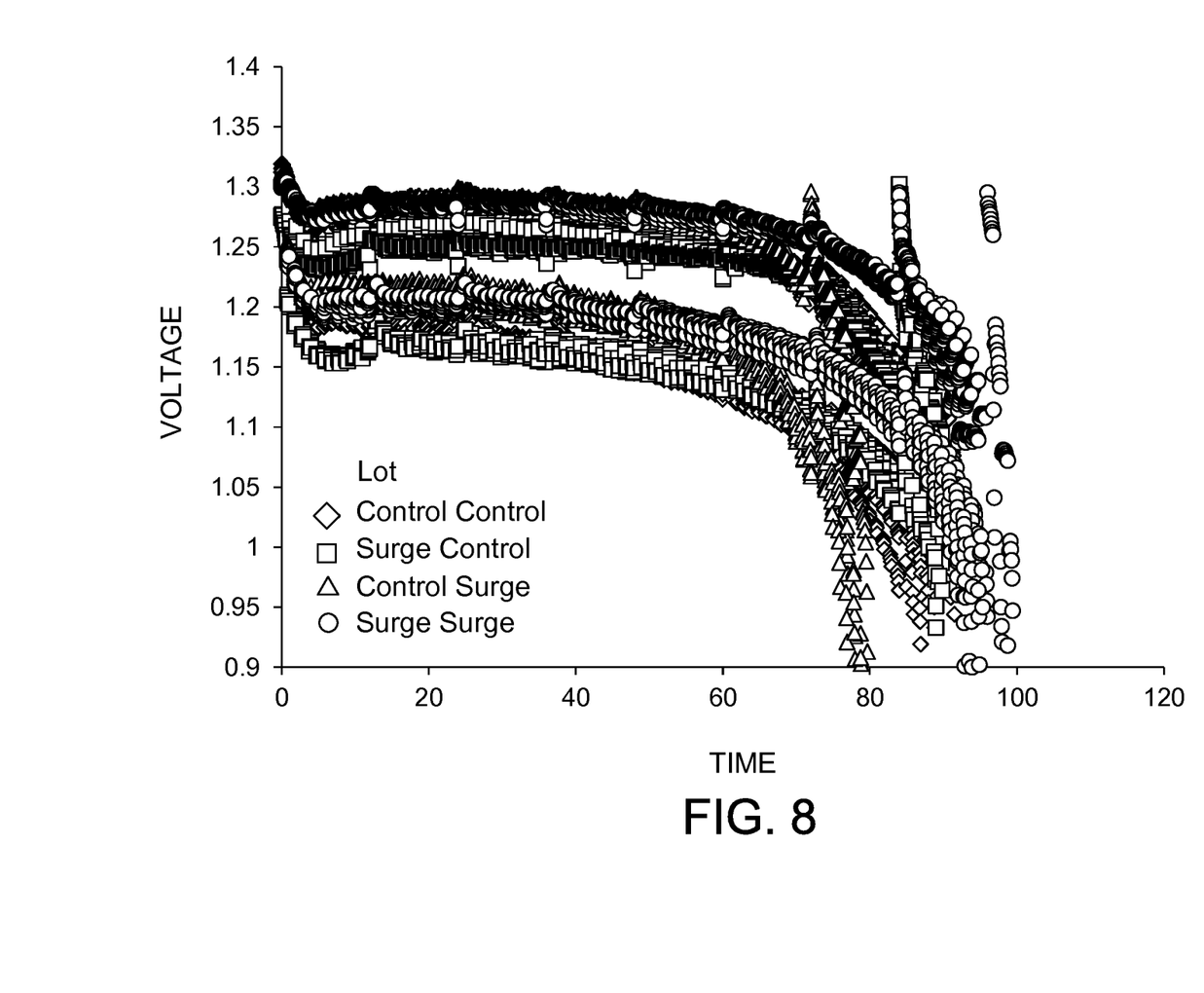
FIG. 8 is a graph of voltage vs. time for cells comprising a control anode mix and a control electrolyte, cells comprising a surge anode mix in accordance with the present disclosure and a control electrolyte, cells comprising a control anode mix and a surge electrolyte in accordance with the present disclosure, and cells comprising a surge anode mix in accordance with the present disclosure and a surge electrolyte in accordance with the present disclosure.

The results of the testing are shown in FIG. 8, which is a scatterplot of Voltage vs. Time for the average of the four sets of cells. As is shown in FIG. 8 and Table 7, the surge anode mix reduced the anode polarization and the surge electrolyte increased the voltage of the cell. Furthermore, there is a greater than additive effect when the surge anode mix and the surge electrolyte are combined.

TABLE 7

| Anode Mix | Electrolyte | Capacity (mAh) | Power (mWh) | Midpoint Voltage | Voltage Gain (mV) |
|---|---|---|---|---|---|
| Control | Control | 246.6 | 295.3 | 1.197 | 0 |
| Surge | Control | 246.8 | 293.5 | 1.189 | −8 |
| Control | Surge | 214.8 | 264.4 | 1.231 | 34 |
| Surge | Surge | 261.4 | 319.5 | 1.222 | 25 |

Further testing was then done for each of these cells. The cells were discharged at 3 mA constant current for 2 hours followed by a 100 ms spike to 12 mA current. This cycle was repeated for 12 hours and was then followed by a 12-hour rest period for the cells before testing resumed. After resuming testing, the testing was stopped when the running voltage of the cells dropped below 0.9 V.

Figure 9:
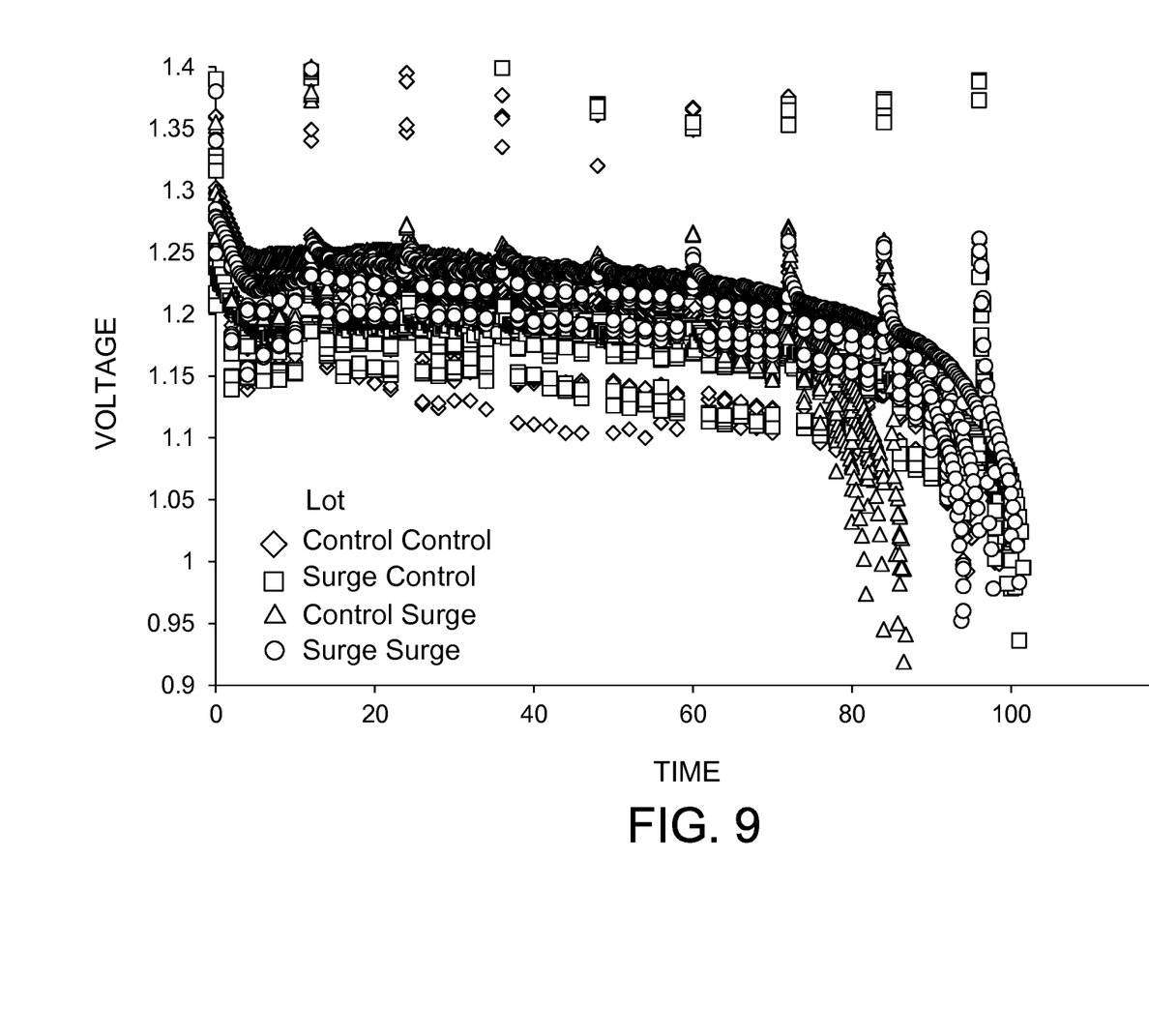
FIG. 9 is a graph of voltage vs. time for cells comprising a control anode mix and a control electrolyte, cells comprising a surge anode mix in accordance with the present disclosure and a control electrolyte, cells comprising a control anode mix and a surge electrolyte in accordance with the present disclosure, and cells comprising a surge anode mix in accordance with the present disclosure and a surge electrolyte in accordance with the present disclosure.

The results of the testing are shown in FIG. 9, which is a scatterplot of Voltage vs. Time for the average of the four sets of cells. As is shown in FIG. 9 and Table 8, the surge electrolyte increased voltage of the cell and the surge anode mix reduced the polarization of the anode. Furthermore, there is a greater than additive effect when the surge anode mix and the surge electrolyte are combined.

TABLE 8

| Anode Mix | Electrolyte | Capacity (mAh) | Power (mWh) | Midpoint Voltage | Voltage Gain (mV) |
|---|---|---|---|---|---|
| Control | Control | 287.0 | 343.5 | 1.197 | 0 |
| Surge | Control | 302.0 | 354.3 | 1.173 | −24 |
| Control | Surge | 255.8 | 312.5 | 1.221 | 25 |
| Surge | Surge | 290.3 | 353.2 | 1.217 | 20 |

In view of the above, it will be seen that the several advantages of the disclosure are achieved and other advantageous results attained. As various changes could be made in the above processes and composites without departing from the scope of the disclosure, it is intended that all matter contained in the above description and shown in the accompanying drawings shall be interpreted as illustrative and not in a limiting sense.

When introducing elements of the present disclosure or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

What is claimed is:

1. A zinc-air cell comprising:
    a cathode;
    an anode comprising an anode mix, wherein the anode mix comprises a polyaniline corrosion inhibitor and an electrolyte comprising a surfactant system; wherein the surfactant system comprises a hexyl diphenyl oxide disulfonic acid surfactant and at least one amphoteric surfactant; and
    a separator disposed between the anode and the cathode;
    wherein the hexyl diphenyl oxide disulfonic acid surfactant is present in an amount of from about 500 ppm to about 5,000 ppm, by weight of the electrolyte;
    the at least one amphoteric surfactant is present in an amount of from about 500 ppm to about 5,000 ppm, by weight of the electrolyte; and
    the polyaniline is present in an amount of from about 100 ppm to about 500 ppm, by weight of the anode mix.

2. The zinc-air cell of claim 1, wherein the at least one amphoteric surfactant has a formula wherein:
$R_1$ is an alkyl group having between 8 and 30 unbranched carbon atoms;
$R_2$ is an alkyl group having between 1 to about 6 unbranched carbon atoms, optionally substituted with 1 or more hydroxyl substituents;

R$_3$ is selected from a polyethylene oxide group having between 3 and 40 ethylene oxide units and a polypropylene oxide group having between 1 to 10 propylene oxide units; and X is an anionic acid group, an anionic acid ester, or an alkali metal salt of an anionic acid or acid ester.

3. The zinc-air cell of claim 1, wherein the at least one amphoteric surfactant has a formula wherein

R$_4$ is an unbranched alkyl group having between 8 and 30 unbranched carbon atoms that form an aliphatic fatty amine when bound to the nitrogen atom;

R$_5$ is selected from a polyethylene oxide group having between 3 and 40 ethylene oxide units and a polypropylene oxide group having between 1 and 10 propylene oxide units; and R$_6$ is selected from hydrogen, a polyethylene oxide group having between 3 and 40 ethylene oxide units and a polypropylene oxide group having between 1 and 10 polypropylene oxide units.

4. The zinc-air cell of claim 1, wherein the surfactant system comprises a mixture of amphoteric surfactants, wherein the first amphoteric surfactant has a formula wherein:

R$_1$ is an alkyl group having between 8 and 30 unbranched carbon atoms;

R$_2$ is an alkyl group having between 1 to about 6 unbranched carbon atoms, optionally substituted with 1 or more hydroxyl substituents;

R$_3$ is selected from a polyethylene oxide group having between 3 and 40 ethylene oxide units and a polypropylene oxide group having between 1 to 10 propylene oxide units; and X is an anionic acid group, an anionic acid ester, or an alkali metal salt of an anionic acid or acid ester; and the second amphoteric surfactant has a formula wherein R$_4$ is an unbranched alkyl group having between 8 and 30 unbranched carbon atoms that form an aliphatic fatty amine when bound to the nitrogen atom;

R$_5$ is selected from a polyethylene oxide group having between 3 and 40 ethylene oxide units and a polypropylene oxide group having between 1 and 10 propylene oxide units; and R$_6$ is selected from hydrogen, a polyethylene oxide group having between 3 and 40 ethylene oxide units and a polypropylene oxide group having between 1 and 10 polypropylene oxide units.

5. The zinc-air cell of claim 1, wherein the surfactant system comprises a mixture of amphoteric surfactants, wherein the mixture comprises one or more polyethoxylated fatty amino carboxylates and one or more polyethoxylated fatty amines.

6. The zinc-air cell of claim 1, wherein the polyaniline is a polyaniline emeraldine base.

* * * * *